United States Patent
Check

(10) Patent No.: US 6,597,073 B1
(45) Date of Patent: *Jul. 22, 2003

(54) CIRCUIT AND METHOD FOR PROVIDING POWER SUPPLY REDUNDANCY

(75) Inventor: Ken Check, San Jose, CA (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,729

(22) Filed: Feb. 18, 1998

(51) Int. Cl.[7] .................................................. H02J 9/06
(52) U.S. Cl. ....................................... 307/64; 307/130
(58) Field of Search ............................. 307/43, 44, 64, 307/65, 66, 80, 85, 86, 87, 130; 361/66, 62, 93, 100

(56) References Cited

U.S. PATENT DOCUMENTS

| | | | | |
|---|---|---|---|---|
| 3,257,603 A | * | 6/1966 | Laube ........................... | 307/66 |
| 3,818,237 A | * | 6/1974 | Straus .......................... | 307/64 |
| 4,090,090 A | * | 5/1978 | Johnston ....................... | 307/87 |
| 4,316,097 A | * | 2/1982 | Reynolds ...................... | 307/66 |
| 4,494,077 A | * | 1/1985 | Fukaya et al. ............... | 330/295 |
| 4,638,175 A | * | 1/1987 | Bradford et al. .............. | 307/64 |
| 4,659,942 A | * | 4/1987 | Volp ............................. | 307/19 |
| 4,709,160 A | * | 11/1987 | Kinoshita .................... | 361/100 |
| 4,752,698 A | * | 6/1988 | Furuyama et al. ........... | 307/116 |
| 5,555,151 A | * | 9/1996 | Baker et al. .................. | 361/79 |
| 5,612,579 A | * | 3/1997 | Wisbey et al. ................ | 307/18 |
| 5,654,859 A | * | 8/1997 | Shi ............................... | 361/66 |
| 5,684,686 A | * | 11/1997 | Reddy .......................... | 363/97 |
| 5,703,415 A | * | 12/1997 | Tanaka ......................... | 307/66 |
| 5,729,059 A | * | 3/1998 | Kilroy et al. ................. | 307/84 |

(List continued on next page.)

FOREIGN PATENT DOCUMENTS

EP  0183597 A1 * 8/1985
EP  0624944 A2 * 11/1994

*Primary Examiner*—Brian Sircus
*Assistant Examiner*—Roberto J. Rios
(74) *Attorney, Agent, or Firm*—Fenwick & West LLP

(57) ABSTRACT

The circuit includes a first power supply coupled to power supply sensor, which is in turn coupled to a first switch and to a third switch. A second power supply is coupled to a second power supply sensor, which is in turn coupled to a second switch and a fourth switch. A first disk drive sensor couples the first and second switches to a first disk drive. A second disk drive sensor couples the third and fourth switches to a second disk drive. The first power supply sensor examines the first power supply to recognize when a failure occurs. When the first power supply is functioning, the first power supply sensor drives the first switch to remain closed and drives the third switch to remain open. Accordingly, the first power supply powers the first disk drive. Upon recognition of a failure, the first power supply sensor drives the first switch to open and the second switch to close. The second power supply then powers the first disk drive and the second disk drive clusters. The second power supply sensor examines the second power supply to recognize when a failure occurs. When the second power supply is functioning, the second power supply sensor drives the fourth switch to remain closed and the third switch to open. Accordingly, the second power supply powers the second disk drive. Upon recognition of a failure, the second power supply sensor drives the fourth switch to open and the third switch to close. Thus, the first power supply powers the first disk drive and the second disk drive clusters. The first disk drive sensor examines the first disk drive to recognize if a failure occurs. Upon recognition of a failure, the first disk drive sensor drives the first and second switches to remain open, thereby isolating the first disk drive from the first power supply and the second power supply. The second disk drive sensor examines the second disk drive to recognize if the second disk drive fails. Upon recognition of a failure, the second disk drive sensor drives the third and fourth switches to remain open, thereby isolating the second disk drive from the first and second power supplies.

25 Claims, 9 Drawing Sheets

U.S. PATENT DOCUMENTS

| | | | | |
|---|---|---|---|---|
| 5,739,596 A | * | 4/1998 | Takizawa et al. | 307/66 |
| 5,751,564 A | * | 5/1998 | Dien | 363/37 |
| 5,808,378 A | * | 9/1998 | O'Leary | 307/87 |
| 5,917,250 A | * | 6/1999 | Kakalec et al. | 307/18 |
| 5,939,799 A | * | 8/1999 | Weinstein | 307/64 |
| 5,959,368 A | * | 9/1999 | Kubo et al. | 307/18 |
| 6,040,640 A | * | 3/2000 | Gehre et al. | 307/66 |
| 6,141,195 A | * | 10/2000 | Buhring et al. | 361/67 |

* cited by examiner

CIRCUIT AND METHOD FOR PROVIDING POWER SUPPLY REDUNDANCY

BACKGROUND OF THE INVENTION

1. Field of the Invention

The invention relates generally to power supplies, and more particularly provides a power supply redundancy circuit for managing a failed power supply in a computer system.

2. Description of the Background Art

Originally, a single power supply powered an entire system such as a computer, and a failure in the power supply inevitably compromised the entire system. To address this problem, engineers have designed systems to reduce the losses caused by a power failure. For example, a first system provides multiple power supplies to the various components of a system, so that upon failure of one power supply only the corresponding component is compromised. A second example system provides full backup power to the system upon failure of the primary power supply.

FIG. 1 is a block diagram illustrating an example prior art fault-intolerant power supply system 100, which includes a first power supply A (110) powering a first disk drive A (130) and a second power supply B (140) powering a second disk drive B (160). The system 100 further includes a first motherboard A (120) being powered by the first power supply A (110), and a second motherboard B (150) being powered by the second power supply B (140). As illustrated by the dotted lines, data may be sent between the first motherboard A (120) and the first disk drive A (130), between the second motherboard B (150) and the second disk drive B (160), and between the first motherboard A (120) and the second motherboard B (150). Disadvantageously, if one of the power supplies A (110) or B (140) fails, then the corresponding disk drive A (130) and motherboard A (120) or disk drive B (160) and motherboard B (150) also fail. Thus, prior art system 100 is power supply fault intolerant. Failure in the power supply will interrupt service, reduce system efficiency, and waste time and money.

FIG. 2 is a block diagram illustrating a second example prior art fault-intolerant power supply system 200. System 200 includes a first power supply A (205) coupled via a first power bus 207 to a first disk drive A (210), and a second power supply B (215) coupled via a second power bus 217 to a second disk drive B (220). A first diode 225 couples the first power bus 207 to the second power bus 217, and a second diode 230 couples the second power bus 217 to the first power bus 207. The first power supply A (205) includes a first "or-ing" diode 235 and the second power supply B (215) includes a second "or-ing" diode (240). The "or-ing" diodes 235 and 240 prevent current from flowing back into the power supplies A. (205) and B (215) if either power supply A (205) or B (215) shorts.

Upon a failure in power supply A (205), the second power supply B (215) is expected to power the disk drive A (210) via the second diode 230. Similarly, upon a failure in power supply B (215), the first power supply A (205) is expected to power the disk drive B (220) via the first diode 225. However, because the power supplies A (205) and B (215) are not isolated, a failure in one power supply can cause a failure in the entire system 200.

FIG. 3 is a block diagram illustrating a third example prior art fault-intolerant power supply system 300. Prior art system 300 includes a first power supply A (305), a second power supply B (315), a first disk drive A (310) and a second disk drive B (320), each coupled together by a common bus 325. Similar to the system 200 illustrated in FIG. 2, the system 300 does not. have isolated power supplies A (305) and B (315), and does not have isolated disk drives A (310) and B (320), and thus a failure in any of the components can cause a failure in the entire system 300. Further, because of the method of interconnection, the system 300 provides poor current sharing. That is, if the power supplies A (305) and B (315) provide different voltages, one power supply A (305) or B (315) may provide all the current for driving both disk drives A (310) and B (320). Thus, because the power supplies A (305) and B (315) do not have dedicated loads, the mean time before failure is disadvantageously reduced.

SUMMARY OF THE INVENTION

The present invention provides a power supply redundancy circuit that switches loads between power supplies upon a power supply failure. The circuit isolates a failed power supply or a failed load, e.g., a failed disk drive, to avoid further component failure. The circuit includes a first power supply coupled to a power supply sensor, which is in turn coupled to a first switch and to a third switch. A second power supply is coupled to a second power supply sensor, which is in turn coupled to a second switch and a fourth switch. A first disk drive sensor couples the first and second switches to a first disk drive. A second disk drive sensor couples the third and fourth switches to a second disk drive. One skilled in the art will recognize that other load devices may alternatively or additionally be used.

In operation, the first power supply sensor examines the first power supply to recognize when a failure occurs. While the first power supply is functioning, the first power supply sensor drives the first switch to remain closed and drives the second switch to remain open. Accordingly, the first power supply powers the first disk drive. Upon recognition of a failure, the first power supply sensor drives the first switch to open and the second switch to close. The second power supply then powers the first disk drive and the second disk drive. Similarly, the second power supply sensor examines the second power supply to recognize when a failure occurs. While the second power supply is functioning, the second power supply sensor drives the fourth switch to remain closed and drives the third switch to remain open. Accordingly, the second power supply powers the first disk drive and the second disk drive. Upon recognition of a failure, the second power supply sensor drives the fourth switch to open and the third switch to close. Thus, the first power supply powers the second disk drive.

The first disk drive sensor examines the first disk drive to recognize if a failure occurs. Upon recognition of a failure, the first disk drive sensor drives the first and second switches to remain open, thereby isolating the first disk drive from the first power supply and the second power supply. Thus, no short circuit occurs to the first or second power supply, which otherwise could cause total system failure. Similarly, the second disk drive sensor examines the second disk drive to recognize if the second disk drive fails. Upon recognition of a failure, the second disk drive sensor drives the third and fourth switches to remain open, thereby isolating the second disk drive from the first and second power supplies. Thus, no short circuit can occur to the first or second power supply, which also could cause total system failure.

In an alternative embodiment, the system includes a first switch for coupling a first power supply to a first load when said first power supply is functioning, a second switch for coupling a second power supply to a second load when said second switch is functioning, and a third switch for coupling the second power supply to the first load when the first power supply fails. The system may further include a fourth switch for coupling the first power supply to the second load when the second power supply fails. The system uses a glitch protector, e.g., a capacitor, for maintaining power to the first load during the transition of the power supplies. The first switch isolates the first power supply from the first load when the first power supply fails. The second switch isolates the second power supply from the second load when the second power supply fails. The system includes a comparator that compares the voltage generated by the power supply against a reference voltage to determine whether the power supply has failed. The comparator controls the corresponding switches.

The present invention further provides a method for providing power supply redundancy. The method includes the steps of coupling a first power supply to a first load when said first power supply is functioning, coupling a second power supply to a second load when said second switch is functioning, and coupling the second power supply to the first load when the first power supply fails. The method may further include the step of coupling the first power supply to the second load when the second power supply fails.

The system and method advantageously may provide automatic toggling from a failed power supply to an operational power supply, isolation of a failed load upon power supply failure, and automatic recovery of the system upon replacement of the failed power supply. Although the system and method shown manages two components, one skilled in the art will recognize that the system may be applied to additional components. Because the loads are separated, neither power supply is overloaded during normal operation.

DETAILED DESCRIPTION OF A PREFERRED EMBODIMENT

The following detailed description illustrates the general principles of the invention, and includes the presently contemplated best mode of carrying out the invention. The description is not to be considered limiting.

Figure 1:
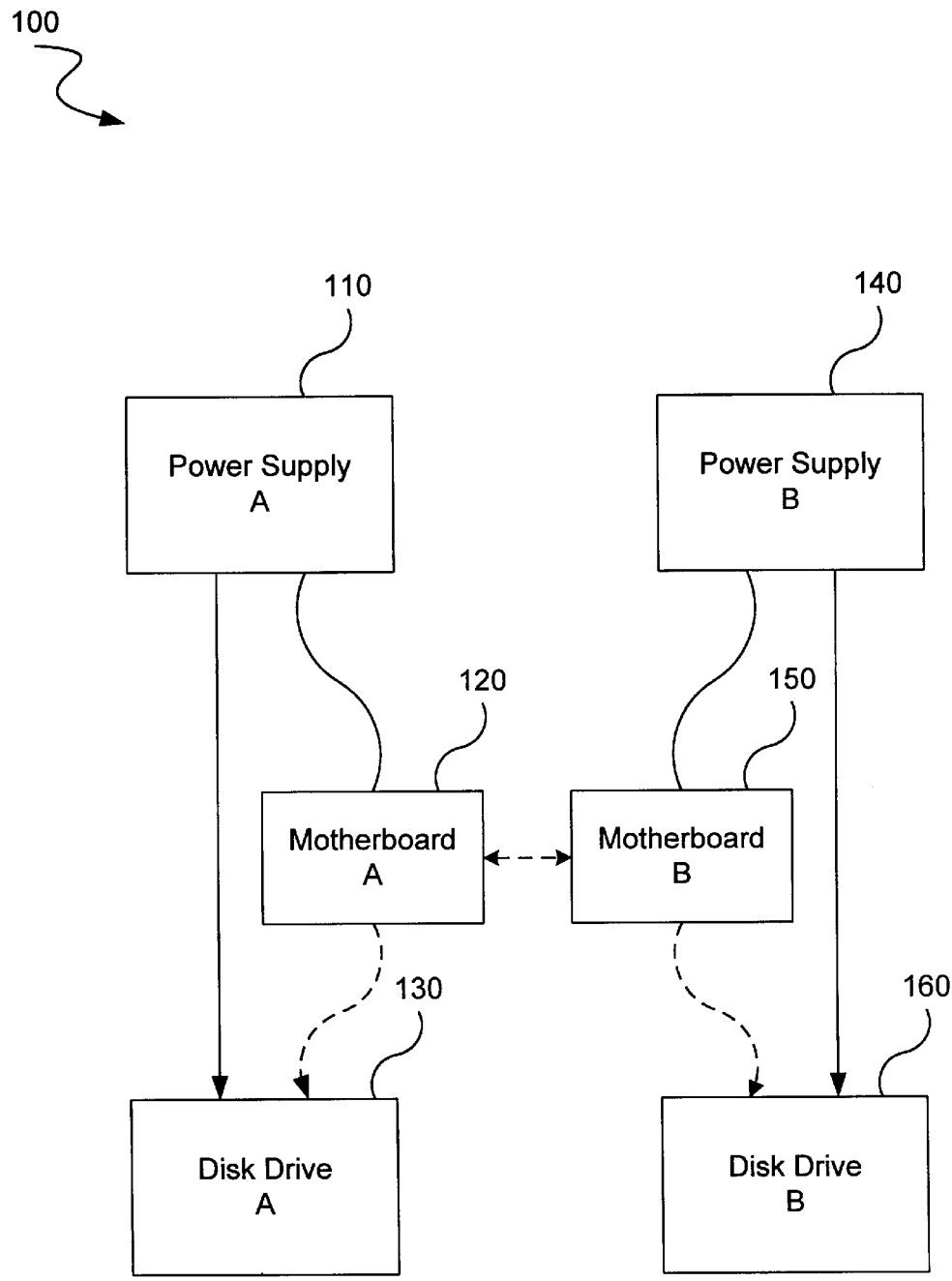
FIG. 1 is a block diagram illustrating a first prior art fault-intolerant power supply system.
Figure 2:
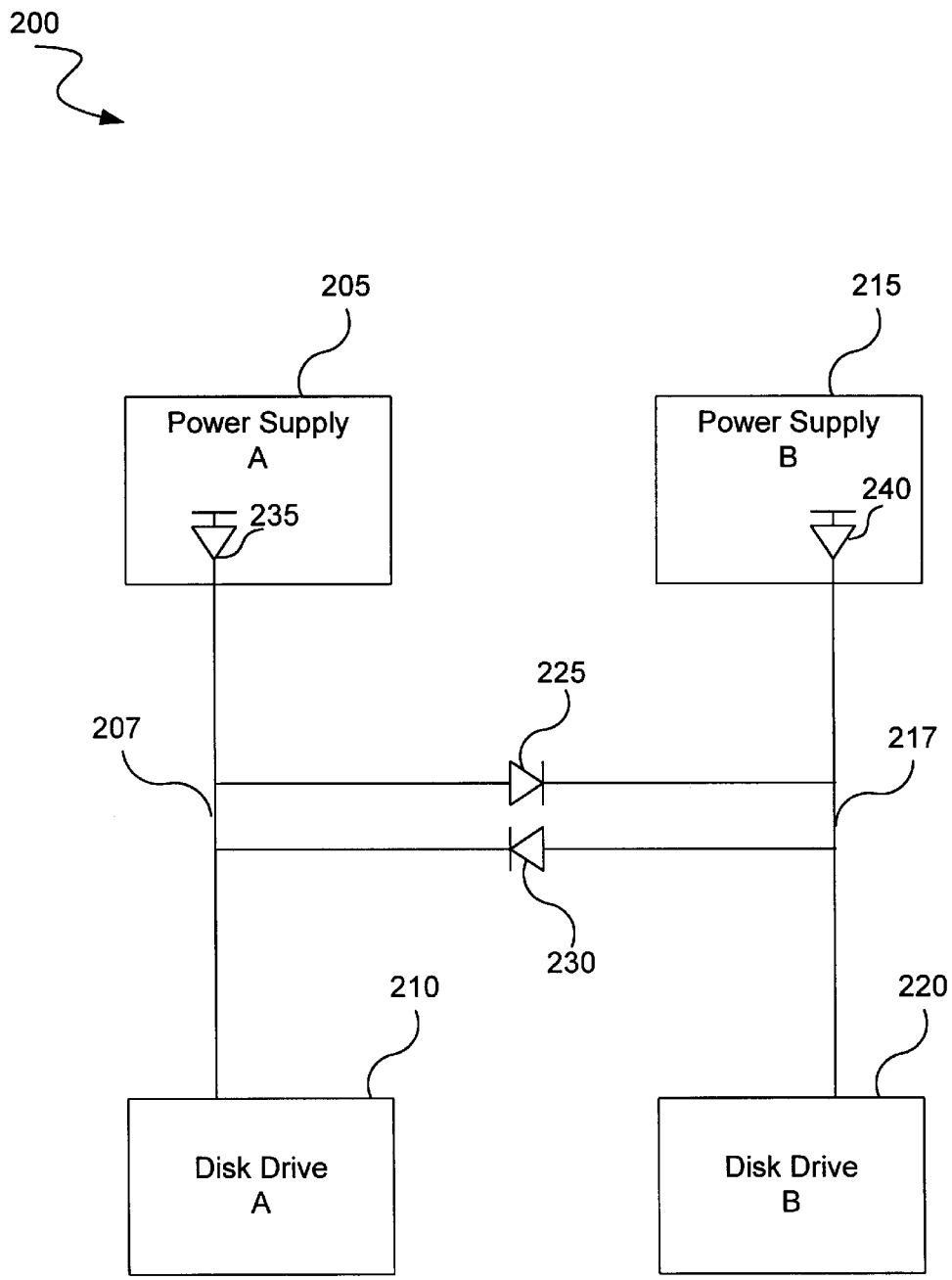
FIG. 2 is a block diagram illustrating a second prior art fault-intolerant power supply system.
Figure 3:
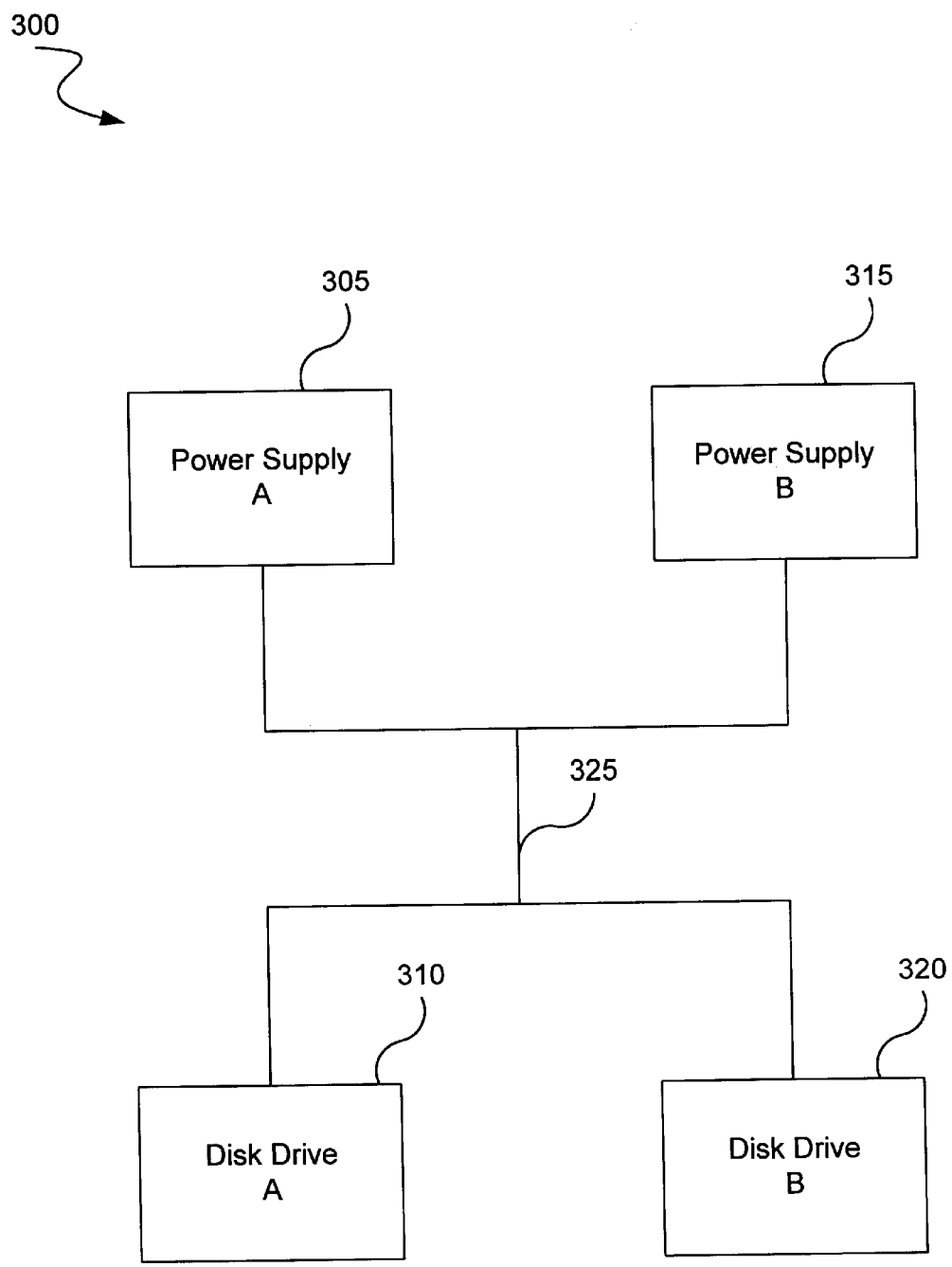
FIG. 3 is a block diagram illustrating a third prior art fault-intolerant power supply system.
Figure 4:
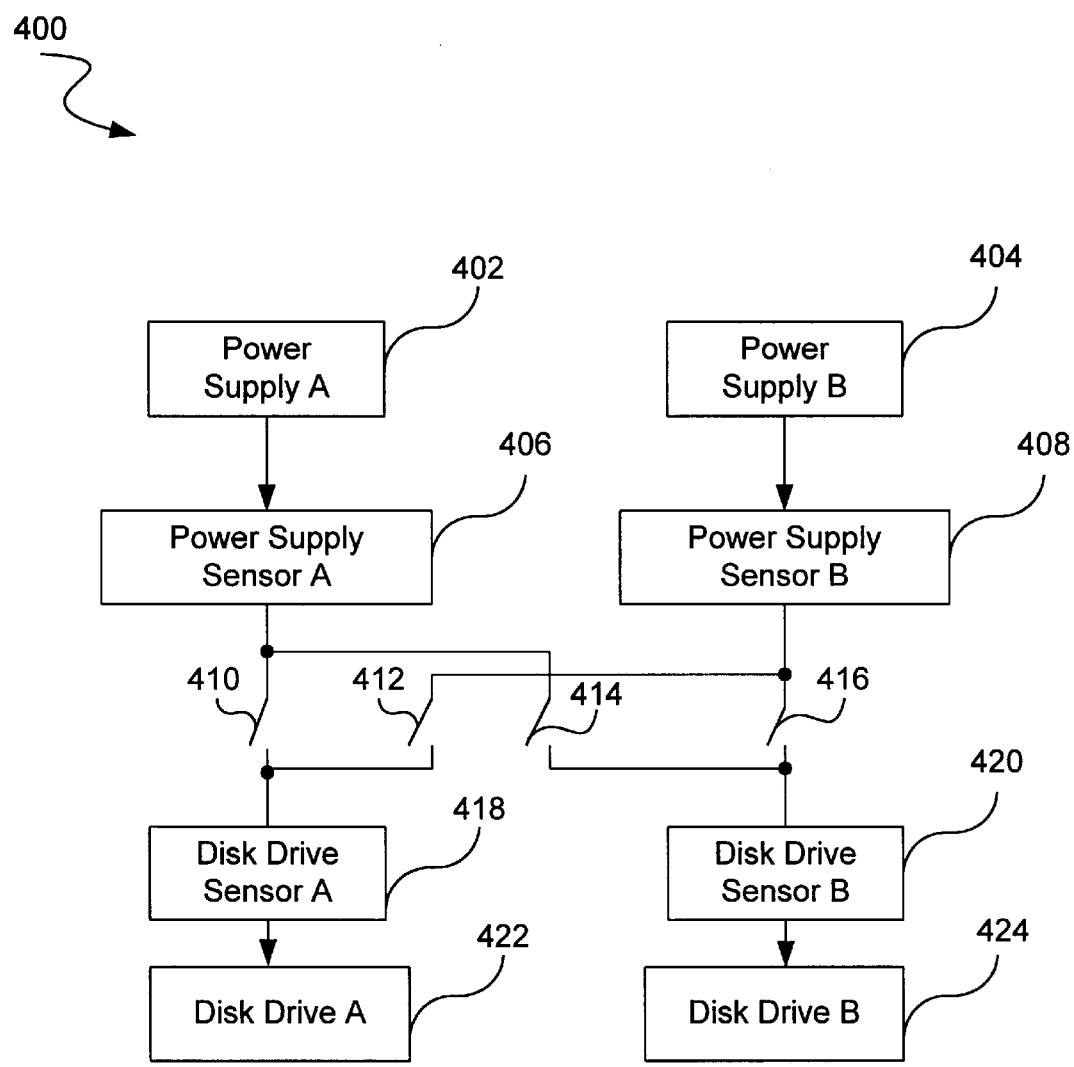
FIG. 4 is a block diagram illustrating a high-level block diagram of a power supply redundancy circuit, in accordance with the present invention.

FIG. 4 is a block diagram illustrating high-level details of a fault-tolerant redundant power supply circuit 400. The redundant power supply circuit 400 includes a first power supply A (402) coupled to a first power supply sensor A (406), which is in turn coupled to a first switch 410 and to a third switch 414. A second power supply B (404) is coupled to a second power supply sensor B (408), which is in turn coupled to a second switch 412 and a fourth switch 416. A first disk drive sensor A (418) couples the first and second switches, i.e., switch 410 and switch 412, to a first disk drive A (422). A second disk drive sensor 420 couples the third and fourth switches, i.e., switch 414 and switch 416, to a second disk drive B (424). Although the circuit 400 is described with reference to disk drives (i.e., disk drive 422 and disk drive 424), one skilled in the art will recognize that other load devices may alternatively or additionally be used.

In operation, the first power supply sensor A (406) examines the first power supply A (402) to recognize when a failure occurs. While the first power supply A (402) is functioning, the first power supply sensor A (402) drives the first switch 410 to remain closed and drives the second switch 412 to remain open. Accordingly, the first power supply A (402) powers the first disk drive A (422). Upon recognition of a failure, the first power supply sensor A (406) drives the first switch 410 to open and the second switch 412 to close. The second power supply B (404) then powers the first disk drive A (422). Similarly, the second power supply sensor B 414 examines the second power supply B (404) to recognize when a failure occurs. While the second power supply B (404) is functioning, the second power supply sensor B (408) drives the fourth switch 416 to remain closed and drives the third switch 414 to remain open. Accordingly, the second power supply B (404) powers the second disk drive B (424). Upon recognition of a failure, the second power supply sensor B (408) drives the fourth switch 416 to open and the third switch 414 to close. The first power supply A (402) then powers the second disk drive B (424).

Further, the first disk drive sensor A (418) examines the first disk drive A (422) to recognize if a failure occurs. Upon recognition of a failure, the first disk drive sensor A (418) drives the first switch 410 and the second switch 412 to open, thereby isolating the failed first disk drive A (422) from the first power supply A (402) and from the second power supply B (404). Thus, no short circuit occurs to the first power supply A (402) or to the second power supply B (404), which otherwise could cause total system failure. Similarly, the second disk drive sensor B (420) examines the second disk drive B (424) to recognize if the second disk drive B (420) fails. Upon recognition of a failure, the second disk drive sensor B (420) drives the fourth switch 416 and the third switch 414 to open, thereby isolating the failed second disk drive B (424) from the first power supply A (402) and from the second power supply B (404). Thus, no short circuit can occur to the first power supply A (402) or to the second power supply B (404), which also could cause total system failure.

For convenience, a truth table is shown below to illustrate the switching patterns of the redundant power supply circuit 400.

| Switch Logic Truth Table | | | | |
|---|---|---|---|---|
| | Switch 410 | Switch 412 | Switch 414 | Switch 416 |
| PSA + PSB | 1 | 0 | 0 | 1 |
| PSA + $\overline{PSB}$ | 1 | 0 | 1 | 0 |
| $\overline{PSA}$ + PSB | 0 | 1 | 0 | 1 |
| DDA + DDB | 1 | 0 | 0 | 1 |

-continued

Switch Logic Truth Table

|  | Switch 410 | Switch 412 | Switch 414 | Switch 416 |
|---|---|---|---|---|
| $\overline{DDA}$ + DDB | 0 | 0 | 0 | 1 |
| DDA + $\overline{DDB}$ | 1 | 0 | 0 | 0 |

As shown in the above table, if each power supply A (402) and B (404) and corresponding disk drive A (422) and B (424) is functioning within an acceptable operational range, switches 410 and 416 close and switches 412 and 414 open. If power supply A (402) fails, switches 410 and 414 open and switches 412 and 416 close. Similarly, if power supply B (404) fails, switches 412 and 416 open and switches 410 and 414 close. If disk drive A (422) fails, then switches 410 and 412 open, thereby isolating the disk drive 422 from the power supply A (402) and from the power supply B (404). Assuming that power supply B (404) is still in working order, switch 416 will be closed and switch 414 will be open. Although not shown, it will be appreciated that if power supply B (404) fails, then switch 416 will open and switch 414 will close. Similarly, if disk drive B (424) fails, then switches 414 and 416 will open, thereby isolating the disk drive B (424) from the power supply A (402) and from the power supply B (404). Assuming that power supply A (402) is still in working order, switch 410 will be closed and switch 412 will be open. Although not shown, it will be appreciated that if power supply A (402) fails, then switch 410 will open and switch 412 will close.

Figure 5:
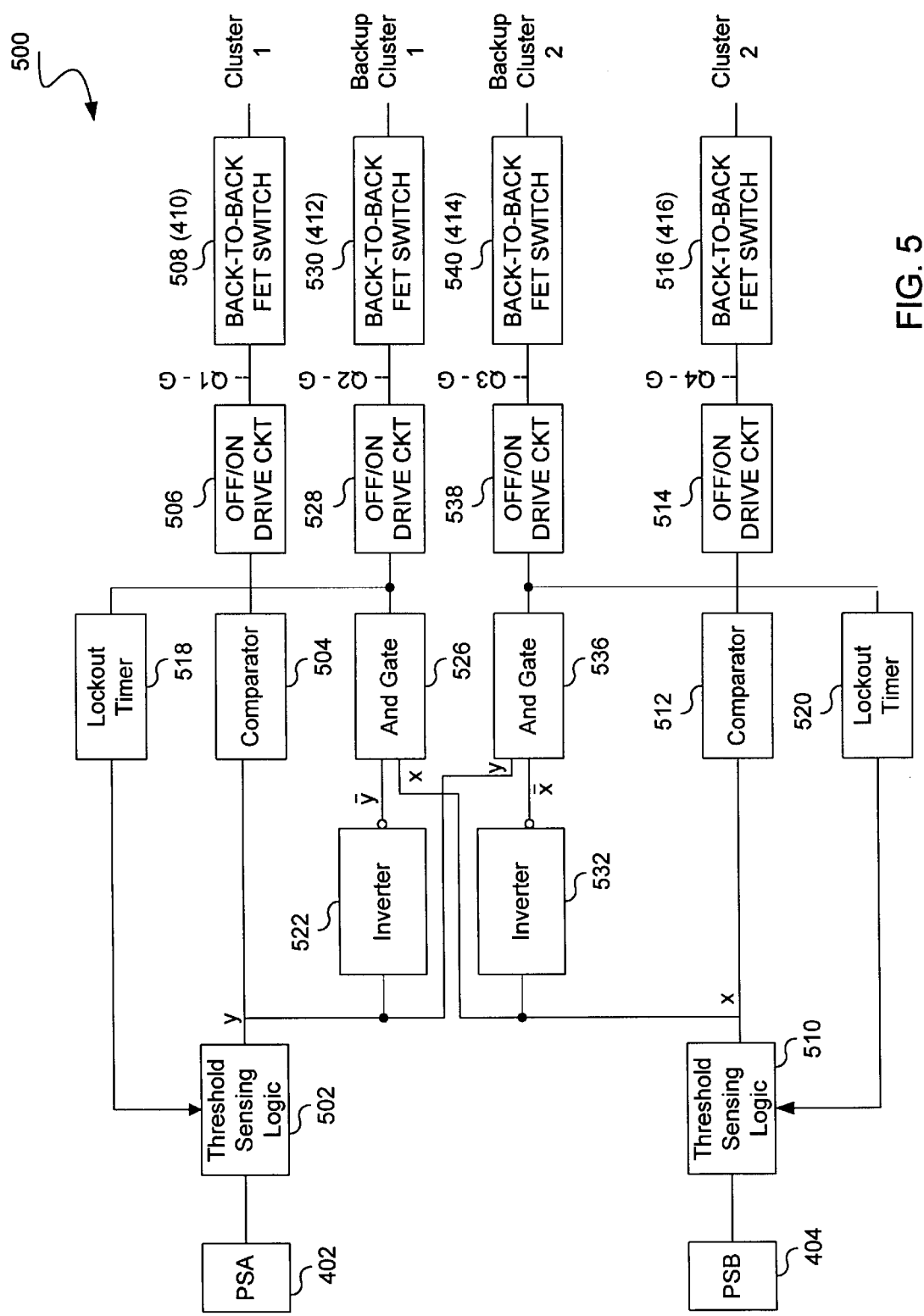
FIG. 5 is a block diagram illustrating lower-level details of the power supply redundancy circuit of FIG. 4.

FIG. 5 is a block diagram illustrating lower-level details of a fault-tolerant redundant power supply circuit 500. Circuit 500 includes the Power Supply A (PSA or PS1) 402 coupled to threshold sensing logic 502, in turn coupled to a comparator 504. An OFF/ON drive circuit 506 is coupled to comparator 504. A back-to-back FET switch 508 is coupled between the OFF/ON drive circuit 506 and a first cluster of disk drives, namely, "cluster 1." Power supply A (402) drives a voltage supply to threshold sensing logic 502, which confirms that the voltage of power supply A (402) is providing sufficient voltage, e.g., providing 4.9V±30 mV (for a 5V power supply). If so, then threshold sensing logic 502 determines that power supply A (402) is in working order and generates a logic level "ON." Otherwise, threshold sensing logic 502 generates a logic level "OFF." The output signal of the threshold sensing logic 502 is labeled "Y."

Comparator 504 compares the output "Y" of the threshold sensing logic 502 against a reference voltage, labeled $V_{REF}$, to determine when the power supply A (402) shifts relative to the reference voltage $V_{REF}$. For example, $V_{REF}$ may be 2.5V. If the voltage of power supply A (402) remains above $V_{REF}$, then the comparator 504 generates a logic level "ON" to represent that power supply A (402) is in working order. Otherwise, the comparator 504 generates a logic level "OFF" to represent that power supply A (402) has failed. OFF/ON drive circuit 506 receives the output of the comparator 504, and based on the logic level drives switch 410, e.g., a back-to-back Field-Effect Transistor (FET) switch 508, to open or close. That is, when the output of comparator 504 is logic level "ON," the OFF/ON drive circuit 506 drives the back-to-back FET switch 508 closed, and thus power supply A (402) drives a first cluster of disk drives, namely, "cluster 1." When the output of comparator 504 is logic level "OFF," the OFF/ON drive circuit 506 drives the back-to-back FET switch 508 open, and thus power supply A (402) is isolated from cluster 1.

Similarly, the circuit 500 includes the Power Supply B (PSB or PS2) 404 coupled to threshold sensing logic 510, in turn coupled to a comparator 512. An OFF/ON drive circuit 514 is coupled to comparator 512. A back-to-back FET switch 516 is coupled between the OFF/ON drive circuit 514 and a second cluster of disk drives, namely, "cluster 2." Power supply B (404) drives a voltage supply to threshold sensing logic 510, which confirms that the voltage of power supply B (404) is providing sufficient voltage, e.g., providing 4.9V±30 mV (for a 5V power supply). If so, then threshold sensing logic 510 determines that power supply B (404) is in working order and generates a logic level "ON." Otherwise, threshold sensing logic 510 generates a logic level "OFF." The output signal of the threshold sensing logic 510 is labeled "X."

Comparator 512 compares the output "X" of the threshold sensing logic 510 against a reference voltage, labeled $V_{REF}$, to determine when the power supply B (404) shifts relative to the reference voltage $V_{REF}$. If the voltage of power supply B (404) is above $V_{REF}$, then the comparator 512 generates a logic level "ON" to represent that power supply B (404) is in working order. Otherwise, the comparator 512 generates a logic level "OFF" to represent that power supply B (404) has failed. OFF/ON drive circuit 514 receives the output of the comparator 512, and based on the logic level drives switch 416, e.g., a back-to-back Field-Effect Transistor (FET) switch 516, to open or close. That is, when the output of comparator 512 is logic level "ON," the OFF/ON drive circuit 514 drives the back-to-back FET switch 516 closed, and thus power supply B (404) drives a second cluster of disk drives, namely, "cluster 2." When the output of comparator 512 is logic level "OFF," the OFF/ON drive circuit 514 drives the back-to-back FET switch 516 open, and thus power supply B (404) is isolated from cluster 2.

Circuit 500 still further includes a first inverter 522 coupled to receive the output "Y" of the threshold sensing logic 502, and includes a first AND gate 526 coupled to receive the inverted output $\overline{Y}$ of the first inverter 522 and the output X of the second threshold sensing logic 510. The first inverter 522 inverts the output Y to $\overline{Y}$. That is, when the output Y is lower than $V_{REF}$, the first inverter 522 generates a logic level "ON." Otherwise, the first inverter 522 generates a logic level "OFF." The first AND gate 526 examines for a failure in the first power supply A (402) and for a valid voltage level from the second power supply B (404). When the first inverter 522 generates a logic level "ON" and the output X is "ON," the first AND gate 526 generates a logic level "ON." If either the first inverter 522 generates a logic level "OFF" or the second power supply B (404) is malfunctioning, then the first AND gate 526 generates a logic level "OFF."

When generating a logic level "ON," the first AND gate 526 causes an OFF/ON drive circuit 528 to close switch 412, e.g., a back-to-back FET switch 530. Thus, the power supply B (404) drives cluster 1 as backup (labeled as "Backup Cluster 1") to power supply A (402). It will be appreciated that power supply A (402) has already been isolated via back-to-back FET switch 508 as described above. When generating a logic level "OFF," the first AND gate 526 causes the OFF/ON drive circuit 528 to open switch 412, e.g., the back-to-back FET switch 530.

Similarly, circuit 500 further includes a second inverter 532 coupled to receive the output "X" of the second threshold sensing logic 510, and includes a second AND gate 536 coupled to receive the inverted output $\overline{X}$ of the second inverter 532 and the output Y of the first threshold sensing logic 502. The second inverter 532 inverts X to $\overline{X}$. That is, when the output X is lower than $V_{REF}$, the second inverter 532 generates a logic level "ON." Otherwise, the second inverter 532 generates a logic level "OFF." The second AND gate 536 examines for a failure in the second power supply B (404) and for a valid voltage level from the first power supply A (402). When the second inverter 532 generates a logic level "ON" and the output Y is greater than $V_{REF}$, the fourth AND gate 536 generates a logic level "ON." If either the second inverter 532 generates a logic level "OFF" or the first power supply A (402) is malfunctioning, then the second AND gate 536 generates a logic level "OFF."

When generating a logic level "ON," the second AND gate 536 causes an OFF/ON drive circuit 538 to close switch 414, e.g., a back-to-back FET switch 540. Thus power supply A (402) drives cluster 1 as backup (labeled as "Backup Cluster 2") to power supply B (404). It will be appreciated that power supply B (404) has already been isolated by back-to-back FET switch 516 as described above. When generating a logic level "OFF," the second AND gate 536 causes the OFF/ON drive circuit 538 to open switch 414, e.g., the back-to-back FET switch 540.

Figure 6:
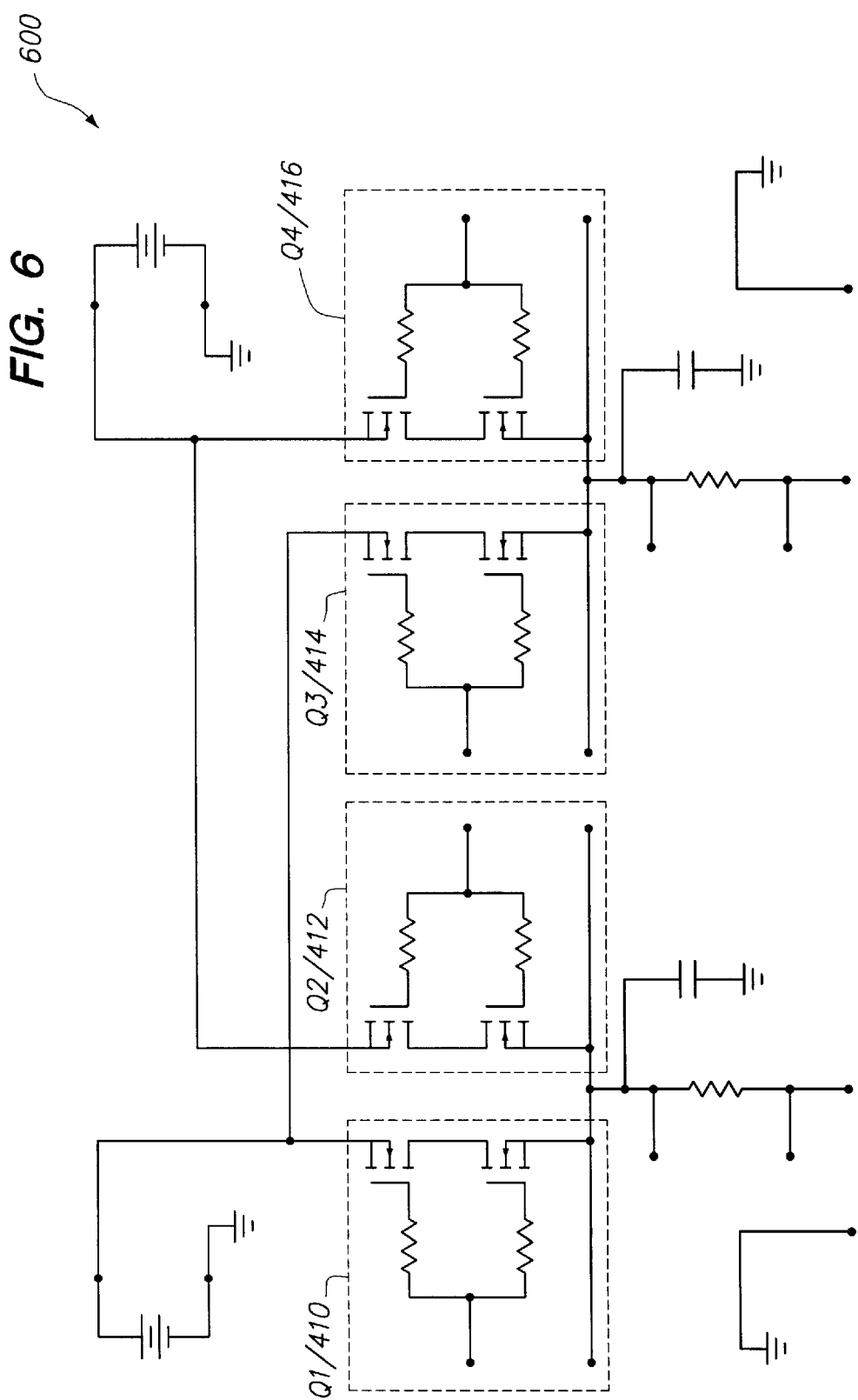
FIG. 6 is a schematic diagram illustrating conceptual details of the power supply circuit of FIG. 4.

FIG. 6 is a conceptual schematic diagram illustrating lower-level details of a circuit 600 embodying the present invention. Circuit 600 includes a first power supply at, for example, 12V (PS1) coupled to switch 410 (Q1) and to switch 414 (Q3), and includes a second power supply at, for example, 12V coupled to switch 412 (Q2) and to switch 416 (Q4). Switch 410 includes a back-to-back FET switch Q1A that includes a first NMOS transistor (e.g., Q1A) and a second NMOS transistor (e.g., Q1B) coupled together by their drains. The first NMOS transistor Q1A has its source coupled to the first power supply PS1 and its gate coupled via a 10 ohm resistor to an output terminal Q1-G of a drive circuit (i.e., an OFF/ON drive circuit 506, 528, 538 or 514). The second NMOS transistor Q1B has its source coupled to an output node Q1-S and its gate coupled via a second 10 ohm resistor to the same output terminal Q1-G of the drive circuit. A first drive, e.g., Drive A, and a glitch protector, e.g., capacitor C1, are both coupled to output node Q1-S.

The drive circuit controls the state of the switch 410. That is, when the drive circuit generates a voltage level "high" at the output terminal Q1-G, the transistors Q1A and Q1B both conduct (i.e., the ON phase). Accordingly, the voltage at terminal Q1-S is driven to about 12V, thereby powering Drive A and biasing capacitor C1. When the drive circuit generates a voltage level "low" at the output terminal Q1-G, the transistors Q1A and Q1B are both off and do not conduct (i.e., the OFF phase). During this OFF phase of switch 410, the back-to-back transistors Q1 and Q2 isolate the power supply 1, and the capacitor C1 conducts and powers Drive A. It will be appreciated that placing switches back to back eliminates the body diode effect of MOSFET switches, so that a short between a power supply and disk drive does not effect operation of the other power supply or disk drive.

It will be appreciated that switch 412, switch 414 and switch 416 each include similar components and operate in a similar manner as switch 410. It will be further appreciated that the drive circuit (not shown) which is coupled to each of the gate Q2-G, Q3-G and Q4-G controls the switches in a manner similar to that described with reference to FIG. 4. That is, when the switch 410 is functioning, the drive circuit turns switch 410 on and turns switch 412 off, thereby isolating power supply 2 from Drive A and enabling power supply 1 to power Drive A. When power supply 1 fails, the drive circuit turns switch 410 off and turns switch 412 on, thereby isolating power supply 1 from drive A and enabling power supply 2 to power Drive A. When power supply 2 is functioning, the drive circuit turns switch 416 on and turns switch 414 off, thereby isolating power supply 1 from Drive B and enabling power supply 2 to power Drive B. When power supply 2 fails, the drive circuit turns switch 416 off and turns switch 414 on, thereby isolating power supply 2 from Drive B and enabling power supply 1 to power Drive B. It will be further appreciated that Drive B may also be protected by a glitch protector, e.g., a capacitor C2, to prevent loss of power during a power supply transition. It will be appreciated that the drive circuits, i.e., the OFF/ON drive circuits 506, 514, 528 and 538, are described in greater detail with reference to FIG. 5, FIG. 7 and FIG. 8.

Figure 7A:
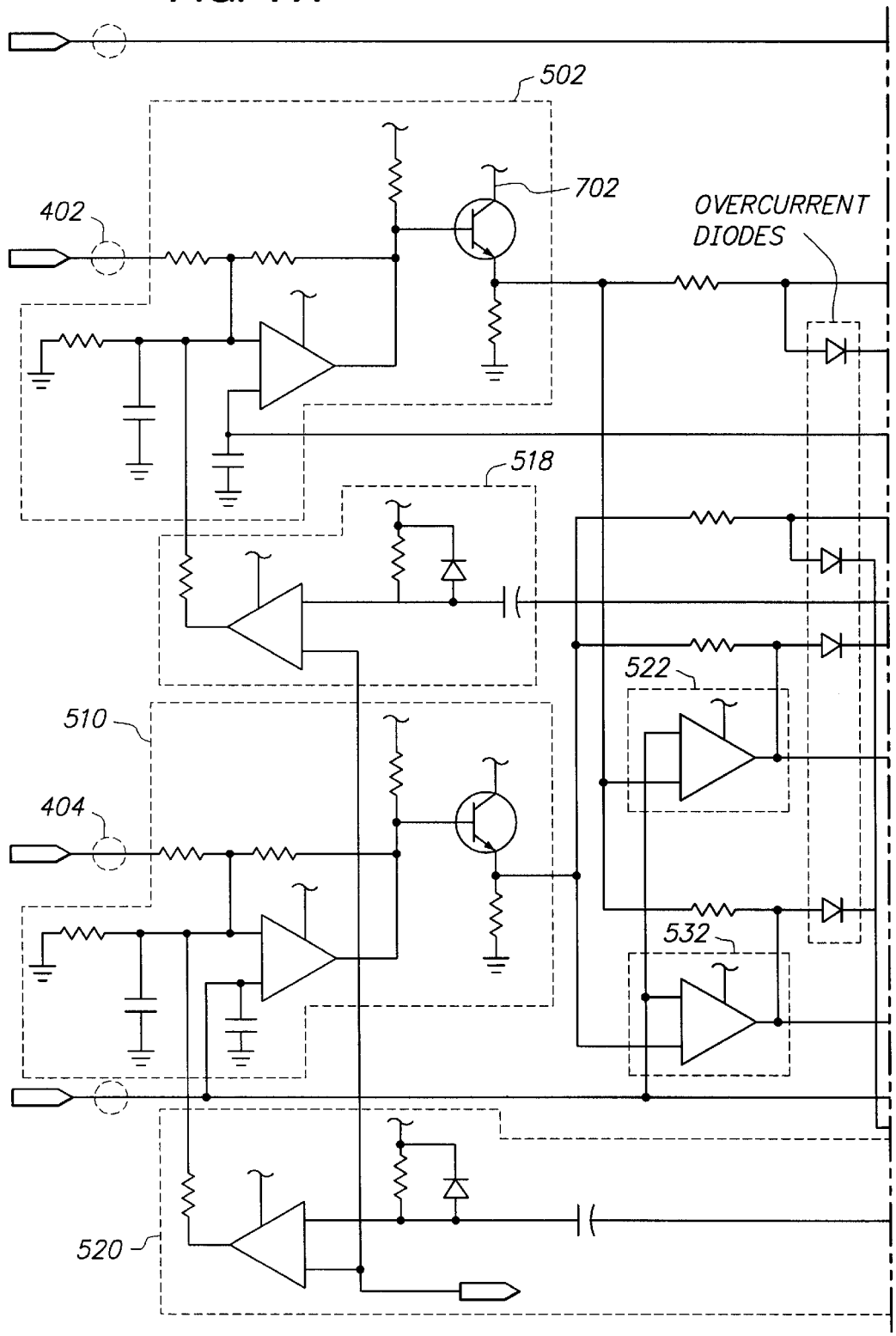
FIG. 7 is a schematic diagram illustrating low-level front-end details of the power supply circuit of FIG. 5.
Figure 7B:
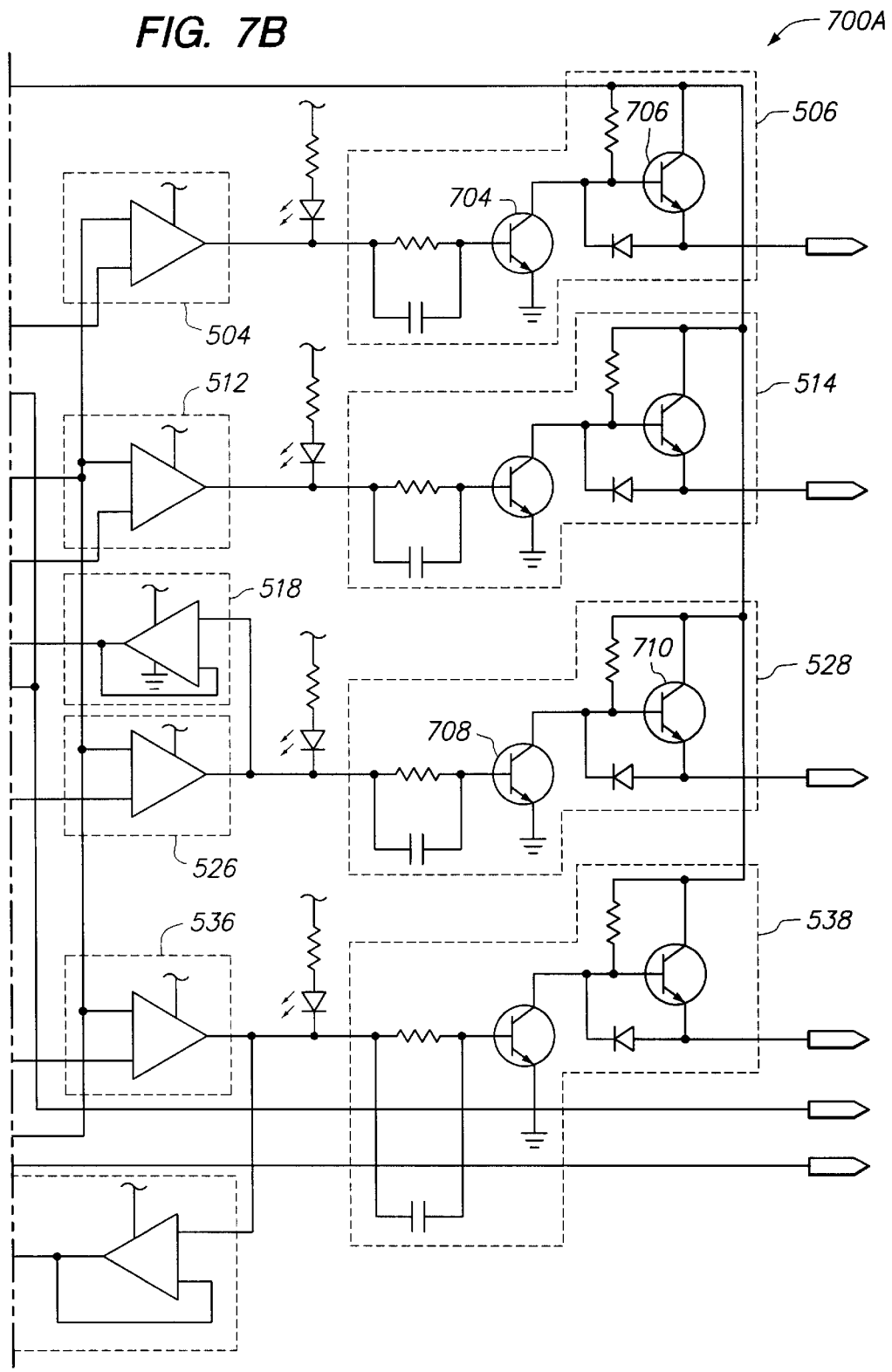
Figure 8:
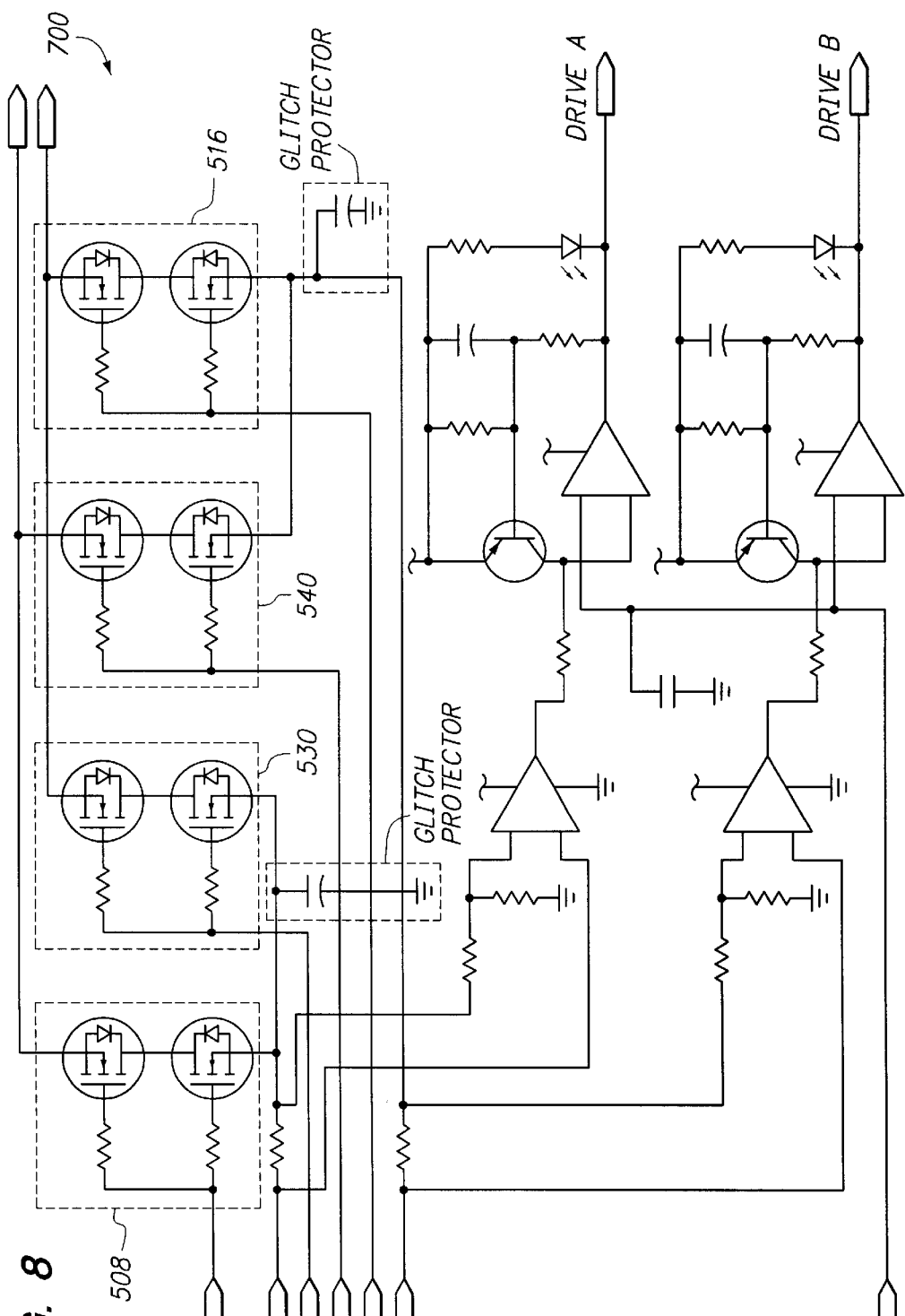
FIG. 8 is a schematic diagram illustrating low-level back-end details of the power supply circuit of FIG. 5.

FIGS. 7 and 8 are schematic diagrams illustrating low-level details of a power supply redundancy circuit 400. More specifically, FIG. 7 is a schematic diagram illustrating front end circuitry 700a of the circuit 400, and FIG. 8 is a schematic diagram illustrating back end circuitry 700b of the circuit 400. It will be appreciated that FIGS. 7 and 8 illustrate example lower level details of each block shown and described with reference to FIG. 5.

Power supply 402 is coupled to threshold sensing logic 502, which includes an emitter-following low impedance buffer transistor 702, voltage dividers, and feedback circuitry from lockout timer 518. The low impedance buffer 702 turns on only when power supply 402 exceeds a minimum voltage. The minimum voltage is controlled by the voltage dividers. When the power supply 402 is functioning, the buffer 702 conducts and generates a high voltage at its emitter node. When the buffer 702 is not conducting, the buffer 702 generates a low voltage level at its emitter. The output of the buffer transistor 702 is transmitted to a comparator 504, which also receives a voltage reference ($V_{REF}$) input. When the difference between the output voltage is greater than the reference voltage $V_{REF}$, the output from the comparator 504 is low (logic level "ON"). Otherwise the output is high (logic level "OFF"). The output of the comparator 504 is sent to OFF/ON drive circuit 506, which includes an inverter 704 and another emitter follower 706. The inverter 704 converts the active low output of the comparator 504 to an active high, and the emitter follower 706 controls the switch 508. Emitter follower 706 generates a high voltage when its gate input is high, and generates a low voltage when its gate input is low. Switch 508 of FIG. 8 includes the same components and operates in a similar manner as switch 508 described with reference to FIG. 5 and FIG. 6.

The output of the emitter follower 702 of threshold sensing logic 502 is further coupled to the input of the first inverter 522. The first inverter 522 compares the output of the emitter follower 702 against the reference voltage VREF, and when the output is less than VREF generates a high voltage level (logic level "ON"). The output of the first inverter 522 is sent to an AND gate 532, which is coupled to and compares the output of the first inverter 522 and the output of the threshold sensing logic 510. When the output of the first inverter 522 and the output of the threshold sensing logic 510 are both greater-than VREF, the AND gate 532 generates a low logic level. If either the output of the first inverter 522 or the output of the threshold sensing logic 510 goes below the reference voltage VREF, then the input to the AND gate 532 goes low and the output of the AND gate 532 goes high. The output of the AND gate 532 controls the active low OFF/ON drive circuit 528 in a manner similar to the OFF/ON drive circuit 506. The back-to-back switch 528 includes similar components and operates in a similar manner to the back-to-back switch 528 shown and described with reference to FIGS. 5 and 6.

It will be appreciated that the components and operations of the remainder of the circuit 400 operate in manner symmetrical to the circuitry described above.

The foregoing description of the preferred embodiments of the present invention is by way of example only, and other variations and modifications of the above-described embodiments and methods are possible in light of the foregoing teaching. For example, the power redundancy circuit 400 is substantially identical to a circuit that includes either a 5 volt power supply or a 12 volt power supply. Further, although the power redundancy circuit 400 use MOSFETs (metal-oxide semiconductor field-effect transistors), alternative embodiments may include other types of switches, e.g., relays, bipolar transistors or Isolated Gate Bipolar Transistors (IGBT). Alternative embodiments of the present invention may include loads other than disk drives. Components of this invention may be implemented using a programmed general purpose digital computer, using application specific integrated circuits, or using a network of interconnected conventional components and circuits. The embodiments described herein are not intended to be exhaustive or limiting. The present invention is limited only by the following claims.

I claim:

1. A circuit comprising:
   a first switch for coupling a first power supply to a first load when said first power supply is functioning, the first switch comprising a first transistor coupled to the first power supply and a second transistor coupled to the first transistor and the first load;
   a second switch for coupling a second power supply to a second load when said second power supply is functioning, the second switch comprising a third transistor coupled to the second power supply and a fourth transistor coupled to the third transistor and the second load;
   a third switch for coupling the second power supply to the first load when the first power supply fails, the third switch comprising a fifth transistor coupled to the second power supply and a sixth transistor coupled to the fifth transistor and the first load;
   a fourth switch for coupling the first power supply to the second load when the second power supply fails, the fourth switch comprising a seventh transistor coupled to the first power supply and an eighth transistor coupled to the seventh transistor and the second load;
   a voltage sensor coupled to the first power supply, the voltage sensor adapted to detect a malfunction of the first power supply by comparing a voltage between the first power supply and the first switch to a pre-defined static voltage threshold; and
   a glitch protector coupled to the first load, to the second transistor, and to the fourth transistor, the glitch protector configured to maintain substantially constant voltage to the first load during the transition of the power supplies.

2. The circuit of claim 1, wherein the first switch isolates the first power supply from the first load when the first power supply fails.

3. The circuit of claim 1 wherein the detector further comprises a comparator for comparing the first power supply against a reference voltage to determine whether the first power supply is functioning.

4. The circuit of claim 3, wherein the comparator controls the first switch.

5. The circuit of claim 3, wherein the comparator controls the third switch.

6. The circuit of claim 1 wherein the detector further comprises a comparator for comparing the second power supply against a reference voltage to determine whether the second power supply is functioning.

7. The circuit of claim 6, wherein the comparator controls the second switch.

8. The circuit of claim 6, wherein the comparator controls the fourth switch.

9. The circuit of claim 3, further comprising a lockout timer coupled to the first comparator for maintaining the results of the comparison for a predetermined time.

10. The circuit of claim 1, further comprising threshold sensing logic coupled to the first power supply for determining whether the first power supply provides a voltage that is greater than a predetermined voltage.

11. The circuit of claim 1, further comprising a first direct current power supply operatively coupled to the first switch.

12. The circuit of claim 11, further comprising a second direct current power supply operatively coupled to the second switch.

13. The circuit of claim 12, wherein the switches are configured to switch a direct current.

14. The circuit of claim 1 further comprising:
   a first load sensor coupled to the first load and second transistor and configured to permit the first switch to disconnect the first load from the first power supply and to permit the third switch to disconnect the first load from the second power supply when the first load fails.

15. The circuit of claim 1 further comprising:
   a second load sensor coupled to the second load and fourth transistor and configured to permit the second switch to disconnect the second load from the second power supply and to permit the fourth switch to disconnect the second load from the first power supply when the second load fails.

16. The circuit of claim 1 further comprising:
   a second voltage sensor coupled to the second power supply, the second voltage sensor adapted to detect a malfunction of the second power supply by comparing a voltage between the second power supply and the second switch to a pre-defined static voltage threshold.

17. A method comprising:
   coupling a first power supply to a first load when said first power supply is functioning, the coupling the first power supply to the first load step further comprising turning on a first transistor coupled to the first power supply and a second transistor coupled to the first transistor and to the first load to permit current to conduct from the first power supply to the first load;
   coupling a second power supply to a second load when said second power supply is functioning, the coupling the second power supply to the second load step further comprising turning on a third transistor coupled to the second power supply and a fourth transistor coupled to the third transistor and to the second load to permit current to conduct from the second power supply to the second load;
   sensing a voltage between the first power supply and the first switch and comparing the voltage to a pre-defined static voltage in order to determine whether the first power supply is failing;
   coupling the second power supply to the first load when the first power supply fails, the coupling the second power supply to the first load step further comprising turning on a fifth transistor coupled to the second power supply and a sixth transistor coupled to the fifth transistor and to the first load to permit current to conduct from the second power supply to the first load; and maintaining substantially constant voltage to the load corresponding to the failed power supply during the transition of the power supplies.

18. The method of claim 17, further comprising the step of isolating the first power supply from the first load when the first power supply fails.

19. The method of claim 17, further comprising the step of comparing the first power supply against a pre-defined static voltage to determine whether the first power supply is functioning.

20. The method of claim 19, further comprising the step of maintaining the results of the comparison for a predetermined time.

21. The method of claim 17, wherein the step of coupling a first power supply comprises coupling a first direct current power supply.

22. The method of claim 17, wherein the step of coupling a second power supply comprises coupling a second direct current power supply.

23. A system comprising:

means for coupling a first power supply to a first load when said first power supply is functioning;

means for coupling a second power supply to a second load when said second power supply is functioning;

means for coupling the second power supply to the first load when the first power supply fails;

means for directly sensing a voltage of the second power supply to determine whether the second power supply is failing by comparing the voltage on the second power supply to a pre-defined static voltage threshold;

means for coupling the first power supply to the second load when the second power supply fails;

means for maintaining substantially constant voltage to the load corresponding to the failed power supply during the transition of the power supplies.

24. The system of claim 23, wherein the means for coupling the first power supply to the first load comprises means for coupling a first direct current power supply to the first load.

25. The system of claim 23, wherein the means for coupling the second power supply to the second load includes means for coupling a second direct current power supply to the second load.

* * * * *